Nov. 23, 1965  M. W. WILTERDINK ETAL  3,219,356
QUICK-CHANGE CHUCK JAW
Filed Jan. 31, 1964
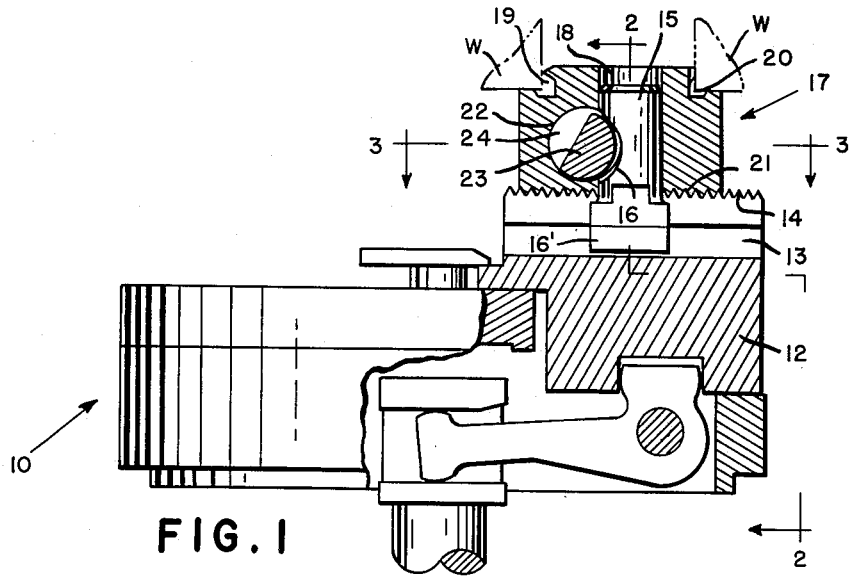
FIG. 1
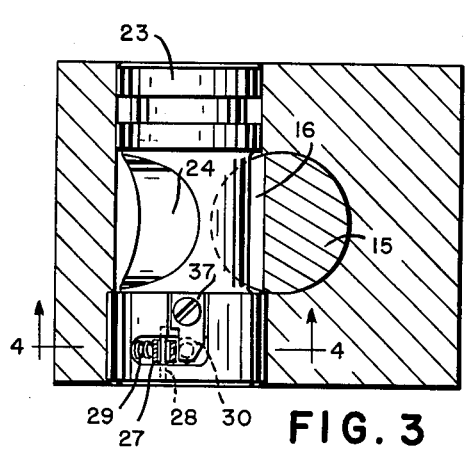
FIG. 3
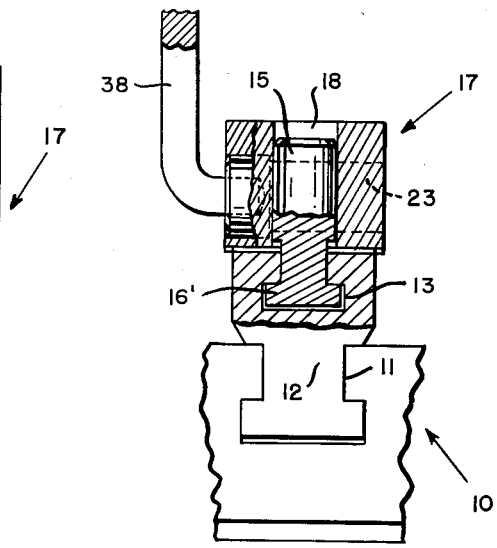
FIG. 2
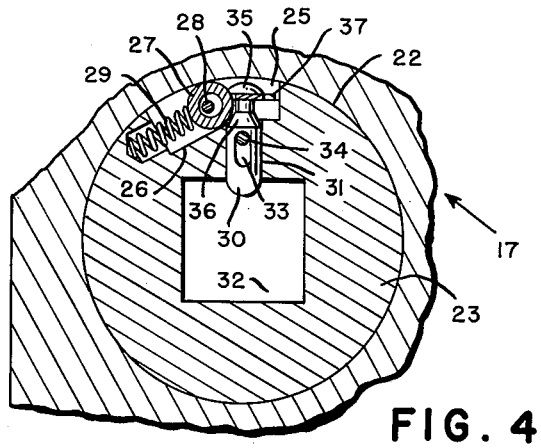
FIG. 4
INVENTORS.
MEREDITH W. WILTERDINK
LEROY E. ALVEY
JESSE W. MENDENHALL
ATTORNEY.

United States Patent Office 3,219,356
Patented Nov. 23, 1965

3,219,356
QUICK-CHANGE CHUCK JAW
Meredith W. Wilterdink, Easton, Leroy E. Alvey, Bridgeport, and Jesse W. Mendenhall, Fairfield, Conn., assignors to The Bullard Company, Bridgeport, Conn., a corporation of Connecticut
Filed Jan. 31, 1964, Ser. No. 341,610
5 Claims. (Cl. 279—123)

This invention relates to chucks for machine tools and particularly to an improved top jaw construction capable of being locked at any one of a plurality of positions along the length of a bottom jaw of the chuck.

Adjustable top jaws have been provided in the past in which a rotatable pin interferes with or clears another right angular pin to effect locking of the top jaw to, or releasing it from, the bottom jaw. It has been found, however, that vibrations incident to the machining of work often effect rotation of the rotatable pin in a direction to loosen the top jaw, causing release of the work and providing a safety hazard to the machine tool operator as well as damaging the machine tool and work.

The principal object of the present invention is to provide a top jaw construction that will overcome the above as well as other problems.

Another object of the invention is to provide such a top jaw construction in which the top jaw is locked in place by a pin that can be rotated in both directions by a tool and is prevented from rotation in one direction when the tool is removed from the top jaw.

Still another object of the invention is to provide such a top jaw construction in which the entire locking and releasing means is located within the confines of the top jaw.

In one aspect of the invention, a chuck may comprise a main body portion having the usual radial slots therein for receiving bottom jaws for radial sliding movement. The usual drawbar may be provided and it may be connected to one arm of the usual form of bell crank lever for each bottom jaw, the opposite arm of which bell crank is connected to the bottom jaw. The arrangement is such that reciprocable movement of the drawbar will simultaneously move each bottom jaw radially of the main body within its corresponding slot.

In another aspect of the invention, the upper surface of the bottom jaw may be serrated, providing teeth adapted to mate with corresponding teeth on the lower surface of a top jaw. The bottom jaw may include a T-slot longitudinally of the bottom jaw and therefore radially of the chuck body when the bottom jaw is mounted in the chuck body.

In a still further aspect of the invention, the top jaw may include vertical and horizontal passages that partially intersect each other, providing intercommunication between said passages. A cylindrical pin having a T-head is mounted for sliding movement within the T-slot of each bottom jaw, and it is provided with an arcuate recess that lies in cooperating position with the opening formed by the intersecting passages in the top jaw. A rotatable pin extends through the horizontal passage in the top jaw and it includes an arcuate recess which, when in position such that it cooperates with the opening formed by the intersecting passages in the top jaw, permits removal of the top jaw from the vertical pin. The center of the arcuate recess within the vertical pin is lower than the center of the arcuate recess in the horizontal pin, so that upon rotation of the latter in one direction, as the solid portion of the pin moves into the recess in the vertical pin, the latter is cammed upwardly, locking the T-head thereof against the walls of the T-slot in the bottom jaw. Rotation of the rotatable pin in the opposite direction returns the arcuate recess in the horizontal pin into cooperating position with the vertical passage, permitting raising of the top jaw to adjust its location along its corresponding bottom jaw.

In still another aspect of the invention, the rotatable pin in the horizontal axis is adapted to be rotated in locking direction and unlocking direction by a tool inserted into a socket within its one end. However, when the tool is removed from the socketed end, the rotatable pin is prevented from rotating in the unloading direction. Thus, a spring pressed roll is provided within another recess in the rotatable pin such that it is normally urged into cam locking relation with the bore of the horizontal passage. A spring pressed detent has a nose portion extending into the socket in the horizontal pin, and this detent is normally urged radially inwardly so that the roll is caused to lock the horizontal pin against rotary motion in one direction while permitting rotary motion in the other direction. However, when a tool is inserted into the socket, the detent is forced into a position preventing the roll from locking the horizontal pin and, therefore, it can be rotated in both directions.

The above, other objects and novel features of the quick-change top jaw will become apparent from the following specification and accompanying drawing which are merely exemplary.

In the drawing:

FIG. 1 is a partial sectional view of a chuck to which the principles of the invention have been applied;

FIG. 2 is an end partial sectional view taken substantially along line 2—2 of FIG. 1;

FIG. 3 is an enlarged sectional view taken substantially along line 3—3 of FIG. 1; and FIG. 4 is a sectional view taken substantially along line 4—4 of FIG. 3.

Referring to the drawing, the principles of the invention are shown as applied to a chuck including a base 10 having radially extending T-slots 11 therein (FIG. 2) for the reception of bottom jaws 12 for radial sliding movement. There usually are three T-slots 11 at 120° intervals about the base 10, only one of which is shown.

The bottom jaw 12 may include a T-slot 13 extending longitudinally thereof, and its top surface may be serrated to provide closely spaced V-shaped teeth 14. A cylindrical pin 15 may include a T-head 16' that slides within T-slots 13. Pin 15 includes an arcuate recess 16 therein for a purpose to be described later.

A top jaw 17 is provided with a through passage 18 adapted slidingly to fit the pin 15. It may include work-engaging edges 19 and 20 for engaging a workpiece W externally or internally, respectively.

The lower surface of the top jaw 17 may also be serrated providing closely spaced V-shaped teeth 21 that mesh with teeth 14 on bottom jaw 12. The top jaw 17 may also include a through passage 22 at right angles to the passage 18 and arranged to partially intersect passage 18, thereby providing communication between the two through passages. The center of the circle defining passage 22 is eccentric with the center of the arcuate recess 16 in pin 15. A cylindrical pin 23 is located within passage 22, and intersects pin 15 along a chord of its circular cross section. Referring to FIG. 3, pin 23 may comprise an arcuate recess 24 which, when pin 23 is rotated so that recess 24 is adjacent the communicating passage formed by the partially intersecting passages 18 and 22, permits top jaw 17 to be moved along pin 15 so that it may be completely removed therefrom or so that serrated teeth 14 and 21 can be separated to permit the relocating of top jaw 17 along bottom jaw 12.

However, when the top jaw 17 is located on bottom jaw 12 with their teeth intermeshing, and pin 23 is turned to move arcuate recess 24 to another rotatable position away from the communicating passage between passages 18 and 22, by virtue of the previously described eccentricity, pin 15 is cammed upwardly to lock its head 16 within T-slot 13 and effectively lock the top jaw in adjusted position.

In order to prevent vibrations from loosening the pin 15, the present invention employs a one-way clutch arrangement that can with facility be rendered ineffective when it is desired to adjust the position of the top jaw 17 on the bottom jaw 12.

Referring to FIGS. 3 and 4, and particularly to FIG. 4, the pin 23 is provided with a recess 25 in its periphery. The recess 25 includes a cam surface 26 along which a roll 27, mounted on a pin 28, is adapted to move a limited amount. A spring 29 normally urges roll 27 upwardly along cam surface 26 so that it binds between the latter and the peripheral surface of passage 22, thereby preventing counterclockwise rotation of pin 23 relative to passage 22, but permitting clockwise movement. A detent 30 is mounted in a radial passage 31 opening into a square recess 32 adapted to receive the end of a wrench. The detent 30 includes a slot 33 therein through which a pin 34 extends. The construction permits limited radial motion of detent 30. Detent 30 has a head 35 and a cam surface 36 adapted to cooperate with roll 27. A leaf spring 37 is anchored at one end to the pin 23 and its other end engages the head 35.

The construction is such that spring 37 normally urges detent 30 into the position shown in FIG. 4, permitting roll 27 to be forced by spring 29 into binding engagement between cam surface 26 and the periphery of passage 22, preventing counterclockwise rotation of pin 23 (which motion tends to remove the upward camming of pin 15) but permits clockwise rotation which tends to cam pin 15 upwardly. Upon inserting a tool 38 into recess 32, detent 30 is forced radially outwardly so that cam surface 36 forces roll 27 down the cam surface 26, thereby permitting both clockwise and counterclockwise rotation of pin 23, and hence releasing the locking of top jaw 17 to bottom jaw 12.

Although the various features of the improved quick-change top jaw have been shown and described in detail to fully disclose one embodiment of the invention, it will become apparent that changes may be made in such details, and certain features may be used without others without departing from the principles of the invention.

What is claimed is:

1. In a chuck, a bottom jaw having a longitudinal slot therein; a top jaw adapted to be clamped to said bottom jaw at a plurality of points along said bottom jaw; intersecting horizontal and vertical passage means in said top jaw; a pin in said vertical passage means, extending into said slot and including a portion adapted to be locked in said slot by upward movement of said pin; a rotatable pin in said horizontal passage means; cam means between said pins adapted to raise said vertical pin when said horizontal pin is rotated in one direction and to lower said vertical pin when said horizontal pin is rotated in the oposite direction; means between said rotatable pin and said top jaw for preventing the rotation of said horizontal pin in a direction to lower said vertical pin; and means cooperating with, and adapted to release said rotation preventing means when it is desired to relocate said top jaw on said bottom jaw.

2. In a chuck, a bottom jaw having a longitudinal slot therein; a top jaw adapted to be clamped to said bottom jaw at a plurality of points along said bottom jaw; intersecting horizontal and vertical passage means in said top jaw; a pin in said vertical passage means, extending into said slot and including a portion adapted to be locked in said slot by upward movement of said pin; a rotatable pin in said horizontal passage means; cam means between said pins adapted to raise said vertical pin when said horizontal pin is rotated in one direction and to lower said vertical pin when said horizontal pin is rotated in the opposite direction; one-way clutch means between said rotatable pin and said top jaw for preventing the rotation of said horizontal pin in a direction to lower said vertical pin; and means for releasing said one-way clutch means when it is desired to relocate said top jaw on said bottom jaw.

3. In a chuck, a bottom jaw; means for moving said bottom jaw radially of said chuck; a top jaw adapted to be mounted at a plurality of positions along said bottom jaw, said top jaw including right angularly arranged cylindrical pins that intersect each other along a chord of their corresponding circular cross sections and which pins include cooperating eccentric arcuate recesses for effecting a camming interference and clearance of the two pins in two rotatable positions of one of the pins; means associated with the rotatable pin for preventing its rotation in one direction; and means cooperating with, and adapted to release said rotation preventing means when it is desired to change the position of said top jaw on said bottom jaw.

4. In a chuck, a bottom jaw; means for moving said bottom jaw radially of said chuck; a top jaw adapted to be mounted at a plurality of positions along said bottom jaw, said top jaw including right angularly arranged cylindrical pins that intersect each other along a chord of their corresponding circular cross sections and which pins include cooperating eccentric arcuate recesses for effecting a camming interference and clearance of the two pins in two rotatable positions of one of the pins; one-way clutch means associated with the rotatable pin for preventing its rotation in one direction; and means for releasing said one-way clutch means when it is desired to change the position of said top jaw on said bottom jaw.

5. In a chuck, a bottom jaw; means for moving said bottom jaw radially of said chuck; a top jaw adapted to be mounted at a plurality of positions along said bottom jaw, said top jaw including right angularly arranged cylindrical pins that intersect each other along a chord of their corresponding circular cross sections and which pins include cooperating eccentric arcuate recesses for effecting a camming interference and clearance of the two pins in two rotatable positions of one of the pins; means associated with the rotatable pin for preventing its rotation in one direction; a recess in one end of said rotatable pin for receiving the end of a tool; and detent means extending into said recess and engageable by said tool end for releasing said rotation preventing means when it is desired to change the position of said top jaw on said bottom jaw.

References Cited by the Examiner

UNITED STATES PATENTS

| 2,569,056 | 9/1951 | HighBerg | 279—123 |
| 2,667,358 | 1/1954 | HighBerg | 279—110 |

ROBERT C. RIORDON, *Primary Examiner.*